United States Patent
Baqai et al.

(10) Patent No.: US 9,641,820 B2
(45) Date of Patent: May 2, 2017

(54) ADVANCED MULTI-BAND NOISE REDUCTION

(71) Applicant: Apple Inc., Cupertino, CA (US)

(72) Inventors: Farhan A. Baqai, Fremont, CA (US); Fabio Riccardi, Palo Alto, CA (US); Russell A. Pflughaupt, San Jose, CA (US); Claus Molgaard, Los Gatos, CA (US); Gijesh Varghese, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/872,098

(22) Filed: Sep. 30, 2015

(65) Prior Publication Data

US 2017/0070718 A1 Mar. 9, 2017

Related U.S. Application Data

(60) Provisional application No. 62/214,514, filed on Sep. 4, 2015, provisional application No. 62/214,534, filed on Sep. 4, 2015.

(51) Int. Cl.
*H04N 9/77* (2006.01)
*H04N 9/64* (2006.01)
(Continued)

(52) U.S. Cl.
CPC .............. *H04N 9/77* (2013.01); *H04N 9/646* (2013.01); *H04N 9/67* (2013.01); *H04N 9/69* (2013.01); *H04N 9/73* (2013.01)

(58) Field of Classification Search
CPC .......... H04N 1/628; H04N 9/77; H04N 9/646; H04N 1/409; H04N 1/4092; H04N 1/58;
(Continued)

(56) References Cited

U.S. PATENT DOCUMENTS 5,130,798 A 7/1992 Christopher
6,018,596 A 1/2000 Wilkinson
(Continued)

OTHER PUBLICATIONS

A. Buades, B. Coll, and J.-M. Morel, "A non-local algorithm for image denoising," in Proceedings of IEEE Conference on Computer Vision and Pattern Recognition, vol. 2, 2005, pp. 60-65.
(Continued)

*Primary Examiner* — Nelson D. Hernández Hernández
(74) *Attorney, Agent, or Firm* — Blank Rome LLP

(57) ABSTRACT

Techniques for de-noising a digital image using a multi-band noise filter and a unique combination of texture and chroma metrics are described. A novel texture metric may be used during multi-band filter operations on an image's luma channel to determine if a given pixel is associated with a textured/smooth region of the image. A novel chroma metric may be used during the same multi-band filter operation to determine if the same pixel is associated with a blue/not-blue region of the image. Pixels identified as being associated with a smooth blue region may be aggressively de-noised and conservatively sharpened. Pixels identified as being associated with a textured blue region may be conservatively de-noised and aggressively sharpened. By coupling texture and chroma constraints it has been shown possible to mitigate noise in an image's smooth blue regions without affecting the edges/texture in other blue objects.

25 Claims, 6 Drawing Sheets

(51) Int. Cl.
*H04N 9/67* (2006.01)
*H04N 9/73* (2006.01)
*H04N 9/69* (2006.01)

(58) Field of Classification Search
CPC .......... H04N 5/208; G06T 2207/20192; G06T 5/003; G06T 5/004; G06T 5/002; G03B 7/28; G06K 9/40
See application file for complete search history.

(56) References Cited

U.S. PATENT DOCUMENTS

| | | | |
|---|---|---|---|
| 6,526,181 | B1 | 2/2003 | Smith |
| 6,804,408 | B1 | 10/2004 | Gallagher |
| 7,426,314 | B2 | 9/2008 | Kimbell |
| 7,432,986 | B2 | 10/2008 | Winger |
| 7,437,013 | B2 | 10/2008 | Anderson |
| 7,515,160 | B2 | 4/2009 | Kerofsky |
| 7,590,303 | B2 | 9/2009 | Lee |
| 7,969,511 | B2 | 6/2011 | Kim |
| 8,108,211 | B2 | 1/2012 | Baqai |
| 8,194,160 | B2 | 6/2012 | Tsuruoka |
| 8,264,574 | B2 | 9/2012 | Grosvenor |
| 8,411,938 | B2 | 4/2013 | Zhang |
| 8,571,347 | B2 | 10/2013 | Srinivasan |
| 8,614,746 | B2 | 12/2013 | Choe |
| 8,711,248 | B2 | 4/2014 | Jandhyala |
| 8,711,249 | B2 | 4/2014 | Baqai |
| 8,743,208 | B2 | 6/2014 | Ovsiannikov |
| 8,768,054 | B2 | 7/2014 | Aragaki |
| 8,989,516 | B2 | 3/2015 | Albu |
| 9,299,130 | B2 | 3/2016 | Panetta |
| 2002/0196907 | A1 | 12/2002 | Shinbata |
| 2006/0023965 | A1 | 2/2006 | Kimbell |
| 2006/0088275 | A1 | 4/2006 | Odea |
| 2006/0274210 | A1 | 12/2006 | Kim |
| 2007/0085857 | A1* | 4/2007 | Bang ............... G06T 7/408 345/591 |
| 2007/0146236 | A1 | 6/2007 | Kerofsky |
| 2007/0258657 | A1 | 11/2007 | Kryda |
| 2008/0199100 | A1 | 8/2008 | Ishiga |
| 2009/0096882 | A9* | 4/2009 | Johnson ............ G02B 27/46 348/222.1 |
| 2009/0129695 | A1 | 5/2009 | Aldrich |
| 2009/0136057 | A1 | 5/2009 | Taenzer |
| 2009/0148063 | A1* | 6/2009 | Hosoda ............. G06K 9/40 382/266 |
| 2009/0322912 | A1 | 12/2009 | Blanquart |
| 2011/0075935 | A1 | 3/2011 | Baqai |
| 2012/0019690 | A1 | 1/2012 | Stirling-Gallacher |
| 2012/0207396 | A1 | 8/2012 | Dong |
| 2012/0301046 | A1 | 11/2012 | Wallace |
| 2012/0307110 | A1 | 12/2012 | Baqai |
| 2013/0329004 | A1 | 12/2013 | Baqai |
| 2014/0044375 | A1 | 2/2014 | Xu |

OTHER PUBLICATIONS

C. Liu, W. T. Freeman, R. Szeliski, and S. B. Kang, "Noise estimation from a single image," in Proceedings of IEEE Conference on Computer Vision and Pattern Recognition, vol. 1, 2006, pp. 901-908.

S. J. Julier, "The scaled unscented transformation," in Proceedings of American Control Conference, vol. 6, 2002, pp. 4555-4559.

X. Liu, M. Tanaka, and M. Okutomi, "Estimation of signal dependent noise parameters from a single image," in Proceedings of IEEE International Conference on Image Processing, 2013, pp. 79-82.

X. Liu, M. Tanaka, and M. Okutomi, "Noise level estimation using weak textured patches of a single noisy image," in Proceedings of IEEE International Conference on Image Processing, 2012, pp. 665-668.

* cited by examiner

ADVANCED MULTI-BAND NOISE REDUCTION

This application claims priority to U.S. Patent Application Ser. No. 62/214,514, entitled "Advanced Multi-Band Noise Reduction," filed Sep. 4, 2015 and U.S. Patent Application Ser. No. 62/214,534, entitled "Temporal Multi-Band Noise Reduction," filed Sep. 24, 2015, both of which are incorporated herein by reference. In addition, U.S. patent application Ser. No. 14/474,100, entitled "Multi-band YCbCr Noise Modeling and Noise Reduction based on Scene Metadata," and U.S. patent application Ser. No. 14/474,103, entitled "Multi-band YCbCr Locally-Adaptive Noise Modeling and Noise Reduction based on Scene Metadata," both filed Aug. 30, 2014, and U.S. Patent Application Ser. No. 61/656,078 entitled "Method of and Apparatus for Image Enhancement," filed Jun. 6, 2012 are incorporated herein by reference.

BACKGROUND

As manufacturing capabilities have improved for image sensor devices, it has become possible to place more pixels in a fixed-size area of silicon. As a consequence, pixel size is shrinking. From a signal processing perspective, more pixels imply that the scene is sampled at a higher rate providing a higher spatial resolution. Smaller pixels, however, collect less light (photons) which, in turn, leads to smaller per-pixel signal-to-noise ratios (SNRs). This means as light levels decrease, the SNR in a smaller pixel camera decreases at a faster rate than SNR in a larger pixel camera. Thus, the extra resolution provided by a smaller pixel image sensor comes at the expense of increased noise.

A side effect of placing more pixels into a fixed-sized silicon sensor is lower pixel well capacity. As pointed out earlier, less photons result in reduced signal everywhere. The impact of reduced signal is particularly severe in blue regions of the image such as the sky. Because each pixel element receives fewer photons, the red channel signal in blue regions is particularly weak (due to the use of Bayer color filter arrays) which, after amplification from white balancing, color correction and local tone mapping manifests itself as noise in blue regions of the image. One approach to this problem would be to enhance the noise reduction strength for blue pixels. This will mitigate noise in blue regions such as sky, but would also result in the removal of texture in other blue regions such as ripples in water, ocean waves, and blue jeans or shirts. Another approach would be to extract regions of the image that contain large relatively smooth blue regions (e.g., sky) using image segmentation techniques and a learning-based method to separate these types of regions from the rest of the image. Noise reduction strengths could then be enhanced in these regions. Image segmentation is, however, a very time consuming and processor-intensive process and is not feasibly implemented in a camera pipeline.

Sharpness and noise are arguably the two most important image quality considerations for an image. Camera manufacturers would like to deliver an image that is sharp with very low noise. Since edges/texture and noise overlap in frequency, often times these are conflicting goals. Typically noise reduction results in a softer image while classical sharpening methods enhance high frequency content in the image (both signal and noise). The challenge is to devise a methodology that removes noise in smooth areas where it is most visible while enhancing sharpness in texture-rich regions.

SUMMARY

In one embodiment the disclosed concepts provide a method to perform multi-band fusion. The method includes receiving an image, the image including a first type of channel (e.g., luma Y) and a plurality of other types of channels, each channel type being different (e.g., Cb and Cr); applying multi-band noise reduction to generate a multi-band pyramidal representation for each channel, wherein each channel's multi-band noise reduction is based on channel-specific and band-specific noise models (e.g., multi-level pyramidal representations of the Y, Cb and Cr channels); determining a texture metric value for the first channel type, the texture metric value based on the first channel type's multi-band pyramidal representation (e.g., to identify pixels in smooth and not-smooth areas of the image); determining a blue-chroma metric value based on the plurality of other channel types, the blue-chroma metric value based on the multi-band pyramidal representations of the plurality of other channel types (e.g., to identify blue and not-blue areas of the image); de-noising aggressively and sharpening conservatively at least some of the pixels in the image's first (e.g., the luma) channel having a texture metric value indicative of a smooth region and a blue-chroma metric value indicative of a blue pixel; de-noising conservatively and sharpening aggressively at least some of the pixels in the image's first (e.g., luma) channel having a texture metric value indicative of a not smooth region and a blue-chroma metric value indicative of a not blue pixel; combining, after de-noising, the first type of channel and the plurality of other types of channels to generate a filtered image (e.g., re-integrate the image's individual channels to create a single image); and storing the filtered image in a memory. For example, the filtered image may be stored in memory as a YCbCr image or an RGB image. In another embodiment, the filtered image may be compressed (e.g., as a JPEG image) before being stored in the memory. In another embodiment, the may further comprise denoising at least some of the pixels in each of the image's plurality of other types of channels. In one embodiment, the texture metric value may be based on a gradient between different pixels in the first channel's multi-band pyramidal representation (the pixels may be in the same or different bands within the pyramidal representation). In yet another embodiment the blue-chroma metric value may be based on a partition of a chromaticity space using one or more threshold values. A computer executable program to implement the method may be stored in any media that is readable and executable by a computer system (e.g., prior to execution a non-transitory computer readable memory).

DETAILED DESCRIPTION

This disclosure pertains to systems, methods, and computer readable media to remove noise and, optionally sharpen, a digital image. In general, techniques are disclosed that use a multi-band noise filter and a unique combination of texture and chroma metrics. More particularly, a novel texture metric may be used during multi-band filter operations on an image's luma channel to determine if a given pixel is associated with a textured or smooth/not-textured region of the image. A novel chroma metric may be used during the the same multi-band filter operation to determine if the same pixel is associated with a blue/not-blue region of the image. Pixels identified as being associated with a smooth blue region may be aggressively de-noised and conservatively sharpened. Pixels identified as being associated with a textured blue region may be conservatively de-noised and aggressively sharpened. By coupling texture constraints with chroma constraints it has been shown possible to mitigate noise in an image's smooth blue regions without affecting the edges/texture in other blue objects.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nonetheless be a routine undertaking for those of ordinary skill in the design and implementation of a graphics processing system having the benefit of this disclosure.

Figure 1:
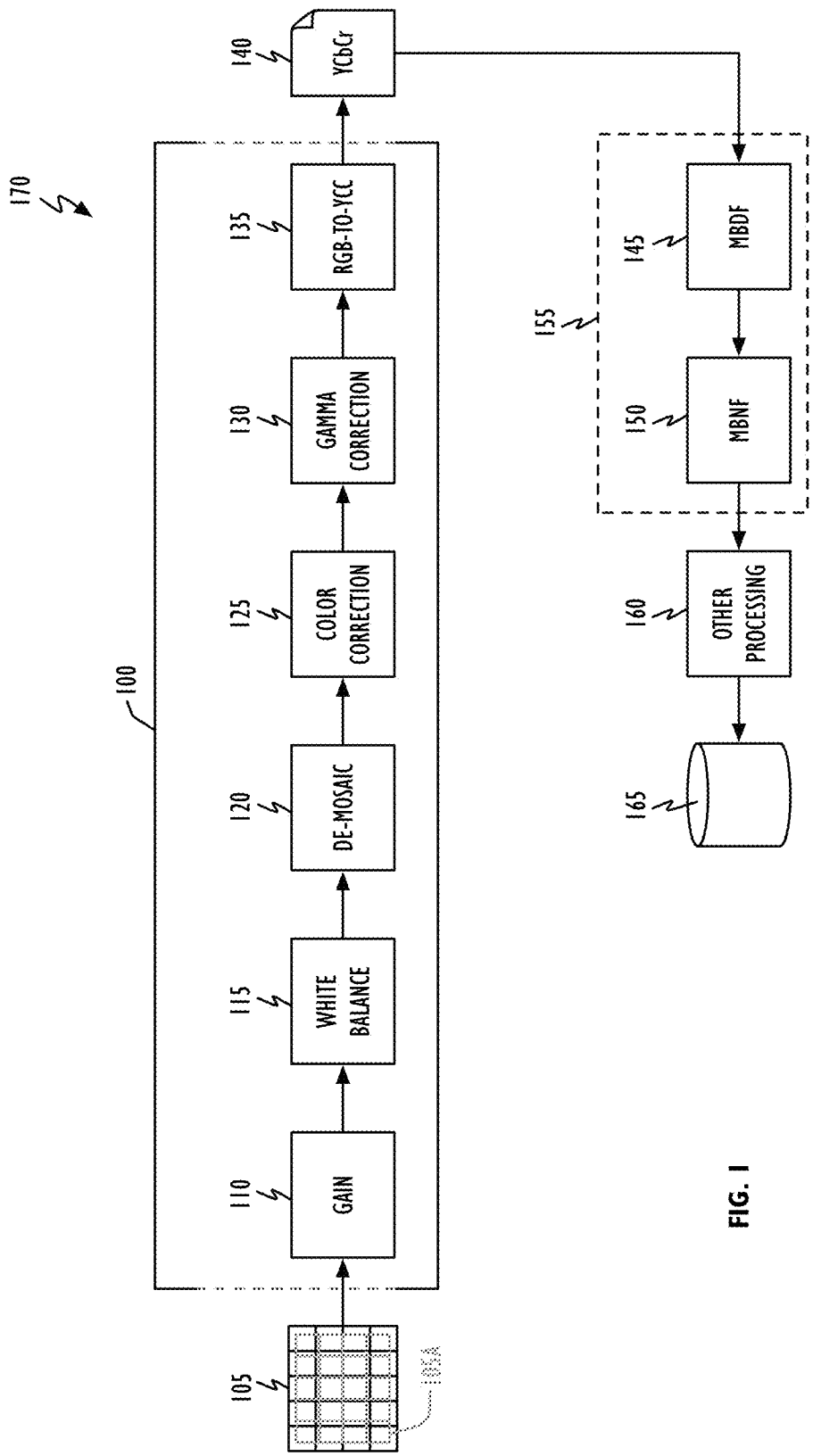
FIG. 1 shows, in block diagram form, an image capture system in accordance with one embodiment.

Referring to FIG. 1, in accordance with one embodiment image signal processor (ISP) or image pipeline 100 takes a raw image from image sensor 105, at which time the image's noise may be characterized as Gaussian, white, and uncorrelated. (The image does, however, exhibit a signal level dependence due to Bayer color filter array 105A). Representative image pipeline 100 includes gain stage 110, white balance stage 115, de-mosaic stage 120, color correction stage 125, gamma correction stage 130, and RGB-to-YCbCr color space conversion stage 135. Unlike a RAW image, the noise of luma-chroma (YCbCr) image 140 is not Gaussian, white or uncorrelated. Rather, image 140 exhibits noise that is channel, level, illuminant and frequency dependent and, further, the different channels may be correlated. Following image pipeline 100 operations, individual channels within luma-chroma image 140 may be separated into different bands by multi-band decomposition filters (MBDF) 145, where after each band may be sharpened and de-noised based on its particular noise model by multi-band noise filters (MBNF) 150. In accordance with this disclosure, the combination of MBDF 145 and subsequent application of MBNF 150 may be referred to as multi-band noise reduction (MBNR) 155. Finally, the noise-reduced and sharpened image may be converted back into the RGB color space and compressed (actions represented by block 160), and saved to storage element 165. Image pipeline 100, sensor 105, MBNR block 155, processing block 160, and storage element 165 represent one embodiment of an image capture system 170. In another embodiment, image capture system 170 does not include processing block 160 and/or storage element 165. An "image capture system" as that term is used in this disclosure is taken to be any collection of elements that can record and apply MBNR operations to a digital image. System 170 (with or without processing block 160 and/or long-term storage element 165) may be found in, for example, digital SLR cameras, digital point-and-shoot cameras, mobile telephones and personal media player devices.

Figure 2:
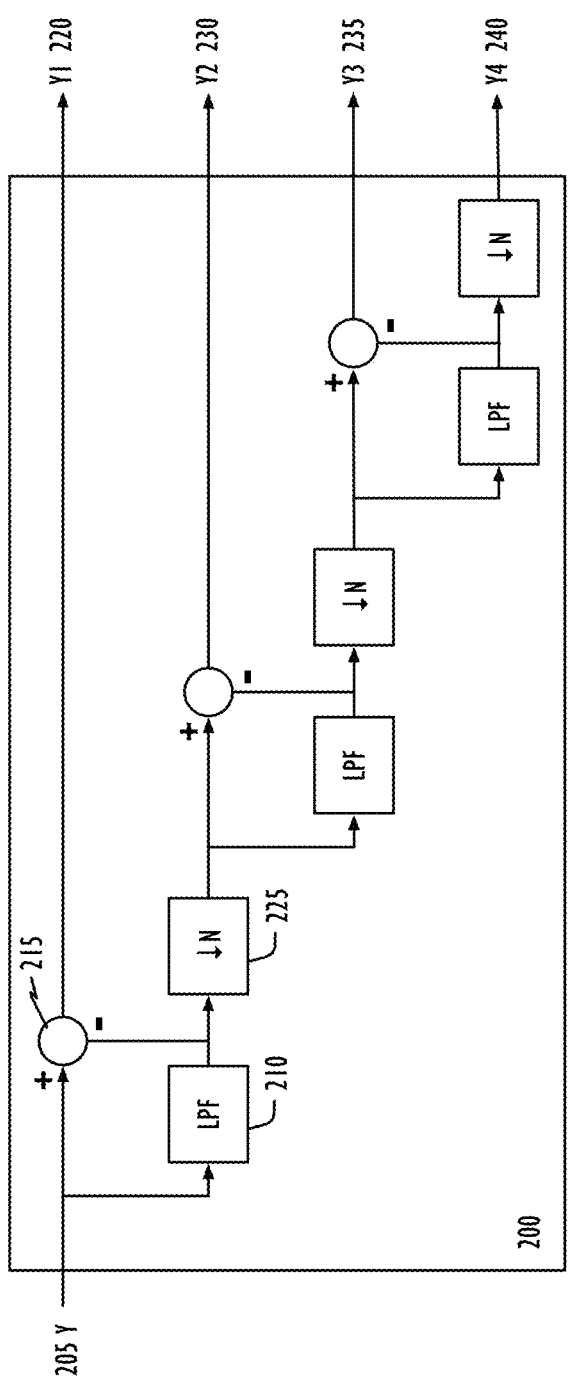
FIG. 2 shows, in block diagram form, a multi-band decomposition filter (MBDF) in accordance with one embodiment.
Figure 2:

Referring to FIG. 2, and as described elsewhere (see above cited applications), luma channel MBDF 200 applies luma channel 205 to a first low-pass filter (LPF) 210. Output from LPF 210 may be fed back to, and subtracted from, incoming luma channel 205 by node 215 to provide first output band Y1 220. Output band Y1 220 characterizes the highest frequency components of luma channel 205. Output from LPF 210 may also be supplied to down-sampler 225. Output from down-sampler 225 provides input to a next level LPF, node, and down-sampler that operates in a manner analogous to LPF 210, node 215 and down-sampler 225 to produce output band Y2 230. Output band Y2 230 characterizes luma channel 205 sans high-frequency band Y1 220. This chain may be repeated with each band's output characterizing luma channel 205 minus all, or substantially all, of the prior bands' frequency components. For example, output band Y3 235 represents luma channel 205 substantially void of the frequency components of output bands Y1 220 and Y2 230. Similarly, output band Y4 240 represents luma channel 205 substantially void of the frequency components of output bands Y1 220, Y2 230, and Y3 235. In one embodiment, each of a MBDF BB00's low-pass filters are similar. In another embodiment, each LPF has the same or substantially the same bandwidth. In yet another embodiment, each LPF may be replaced by a high-pass filter. In some embodiments, channel data may be down-sampled by a factor of two in each direction (e.g., N=2 for down-sampler 225). Thus, an input channel that is 8 mega-pixel (MP) in size will be 2 MP in size after being down-sampled once, 0.5 MP after being down-sampled a second time, 0.125 MP after being down-sample a third time, and so forth. Multi-band decomposition filters 245 (for Cb channel 250) and 255 (for Cr channel 260) may each operate similarly to MBDF 200 so as to produce Cb bands 265 and Cr bands 270. In one embodiment, each chroma channel may be decomposed into the same number of bands as is the luma channel (e.g., via MBNF 300). In another embodiment, chroma channels may be decomposed into a different number of bands that is the luma channel.

Figure 3:
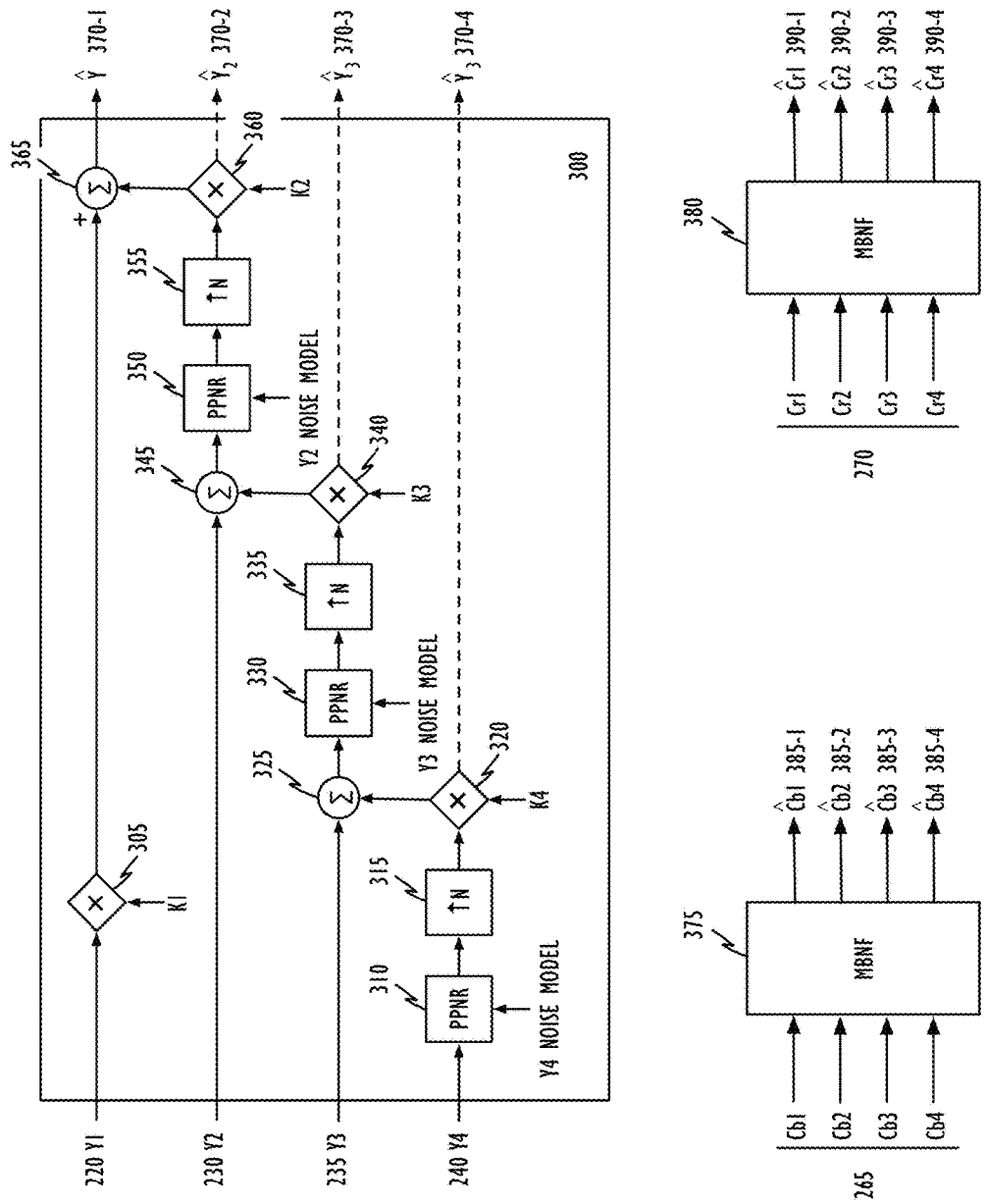
FIG. 3 shows, in block diagram form, a multi-band noise filter (MBNF) in accordance with one embodiment.

Referring to FIG. 3, also described elsewhere (see above cited applications), luma channel MBNF 300 applies the luma channel's Y1 band 220 to a first sharpening filter 305. Sharpening filter 305 may use a tuning parameter, K1, to control the amount of sharpness/fine grain amplitude desired. According to some embodiments, for bright scenes sharpening filter 305 may not provide any attenuation (e.g., K1=1.0). If more sharpness is desired, K1 could be set to a value greater than 1. For low light levels where pipeline artifacts become more visible, K1 may progressively become smaller, i.e., K1<1.0. Next, the lowest frequency band information, output band Y4 240 in the example of FIG. 2, may be filtered in accordance with per-pixel noise reduction element (PPNR) 310. As shown, PPNR filter 310 uses output band Y4's 240 particular noise model. In one embodiment, the noise model used may be of the type described in the above-identified applications. In other embodiments however, the noise model may be identified in any manner appropriate to the environment a particular image capture system is to be used in. In general, the task of denoising filters such as element 310 is to determine which pixels are similar to the pixel being de-noised. Those pixels determined to be similar may be combined in some fashion and the resulting value (e.g., average or median) substituted for the original value of the pixel being de-noised. The amount of denoising to be applied may be adjusted by the threshold used to trigger the decision of whether two pixels are similar. Little denoising is tantamount to choosing a narrow band about a value expected for the pixel being de-noised. Lots of denoising is tantamount to choosing a broad band about the value expected for the pixel being de-noised. The former combines relatively few pixels to determine a new value for the pixel being de-noised. The latter combines relatively many pixels to determine a new value for the pixel being de-noised. Stated differently, conservative de-noising refers to selecting a threshold that yields relatively few pixels that are similar; aggressive de-noising refers to selecting a threshold that yields relatively more pixels that are similar. Next, the noise reduced data from PPNR filter 310 may be up-sampled by up-sampler 315 and sharpened by sharpening filter 320. In one embodiment, the amount of up-sampling provided by element 320 mirrors the amount of down-sampling used to generate output band Y4 240 (see FIG. 2). Sharpening filter 320 may use a tuning parameter, K4, in a manner analogous to filter 305's tuning parameter. De-noised and sharpened data may be combined with the next higher frequency band via node 325, where after elements 330, 335, 340 and 345 filter, up-sample, sharpen, and combine in a manner analogous to elements 310-325. Similarly, output from combining node 345 is operated on by PPNR filter 350, up-sampled by up-sampler 355, sharpened by sharpening filter 360 (with its own tuning parameter K2), and finally combined with the output from sharpening filter 305 in node 365 to produce de-noised and sharpened luma signal $\hat{Y}$ 370-1. Shown as 370-2, 370-3 and 370-4 are the individually filtered and sharpened levels $\hat{Y}_2$, $\hat{Y}_3$, and $\hat{Y}_4$ respectively. Multi-band noise filters 375 (for Cb channel output bands 265) and 380 (for Cr channel output bands 270) may each operate similarly to MBNF 300 to produce de-noised output channels $\hat{C}b1$ to $\hat{C}b4$ 385 and channels $\hat{C}r1$ to $\hat{C}r4$ 385-1 to 385-4 and 390-1 to 390-4 respectively. It is noted, however, that Chroma MBNFs 375 and 380 do not, in general, use sharpening filters. In the embodiment shown in FIG. 3, output band Y1 220 is not noise filtered. This need not be true in all implementations. In general, for chroma channels (Cb and Cr), the highest frequency band will be noise filtered. In addition, while sharpening filter tuning parameters K1-K4 have been discussed as acting similarly they need not have the same value. Further, in other embodiments one or more of sharpening filters 305, 320, 340, and 360 may be omitted.

In the prior cited work, sharpening factors and de-noising strengths that use the multi-band decomposition and noise reduction technology described above have been disclosed. While superior to other methods, their sharpening and de-noising factors may be fixed for a given capture/image. That is, the earlier approaches provide no natural or obvious mechanism to address the added noise in smooth blue regions such as the sky (e.g., due to sensor 105's low well capacity and its attendant weak red channel signal). This prior work is herein extended so that it can better differentiate between smooth and edge/texture regions. In the approach taken here, it can be helpful to think of the MBDF filters 200 (Luma channel), 245 (Cb channel), and 255 (Cr channel) as generating a pyramidal decomposition of their input images 205, 250, and 260 respectively. In this way images (e.g., individual channels) may be manipulated based on pixels within a single band/layer or between different bands/layers.

To determine if a pixel $p_i(x, y)$ in band 'i' belongs to a smooth region or an edge/texture portion of an image, horizontal and vertical gradients on the luma (Y) channel may be determined:

$$d_x = Y_i(x+1,y) - Y_i(x,y) \text{ and} \qquad \text{EQ. 1A}$$

$$d_y = Y_i(x,y+1) - Y_i(x,y), \qquad \text{EQ. 1B}$$

where $d_x$ represents the horizontal or 'x' gradient, $d_y$ represents the vertical or 'y' gradient, 'x' and 'y' represent the coordinates of the pixel whose gradients are being found, and $Y_i(x, y)$ represents the luma channel value of the pixel at location (x, y) in the i-th level. In one embodiment, a degree of textureness metric may be taken as the maximum of the two gradient values: $\max(d_x, d_y)$. In other embodiments, a textureness metric could be the $\text{mean}(d_x, d_y)$, $\text{median}(d_x, d_y)$, or Euclidean distance $\sqrt{d_x^2 + d_y^2}$, between the two gradient values. In practice, any measure that is appropriate for a given implementation may be used. For example, Sobel and Canny type edge detectors may also be used.

To reduce this metric's sensitivity to noise, this textureness metric may be based on a scaled-up version of the next band (pyramid level):

$$d_x = Y_{i+1}(x+1,y) - Y_{i+1}(x,y) \text{ and} \qquad \text{EQ. 2A}$$

$$d_y = Y_{i+1}(x,y+1) - Y_{i+1}(x,y), \qquad \text{EQ. 2B}$$

where $Y_{i+1}(x, y)$ represents the luma channel value in the i-th plus 1 band at location (x, y). Since each band is a filtered and down-sampled version of the immediately higher band (e.g., compare output band Y4 240 to output band Y3 235), determining an edge/texture metric on a scaled up version of the next higher band, provides a textureness metric that captures only significant edges and textures. This allows a MBNF to de-noise smooth areas more and sharpen them less, while de-noising textured regions less and sharpening them more. EQS. 1 and 2 provide a metric wherein the degree of sharpening may be proportional to the textureness metric value or strength: a higher value may be used to apply more sharpening. EQS. 1 and 2 also provide a measure wherein the degree of de-noising may be inversely proportional to the edge/texture metric value or strength (meaning edge/texture pixels are de-noised less while smooth pixels are de-noised more).

Another metric that may be used to determine if a pixel belongs to a smooth region may be based on the difference between a pixel at the i-th band and a pixel in the up-sampled version of the next lower (i+1) band:

$$\Delta_{band} = Y_i(x,y) - Y_{i+1}(x,y) \uparrow N \qquad \text{EQ. 3}$$

A low $\Delta_{band}$ metric value may be indicative of the pixel belonging to a smooth region, while a large value may indicate the pixel belongs to an edge/texture. The earlier described edge strength measure coupled with the high frequency estimate of EQ. 3 can provide a very robust technique to determine whether a pixel is on/in an edge/texture region. With these extensions, smooth areas may again be de-noised more and sharpened less, while edge/texture regions may again be de-noised less and sharpened more.

Figure 4A:
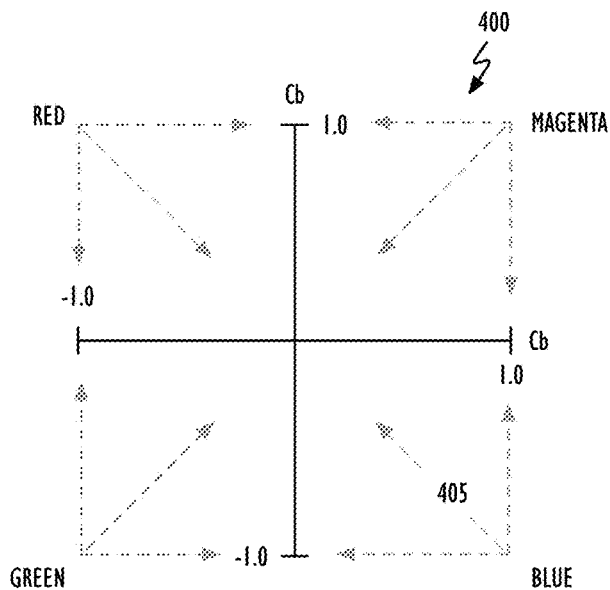
FIGS. 4A-4C illustrate CbCr chromaticity spaces in accordance with two embodiments.

Referring to FIG. 4A, CbCr chromaticity diagram 400 illustrates the color shading in the CbCr chromaticity space. To mitigate against the added noise in an image's smooth blue regions such as the sky (due to a sensor's weak red channel signal in these regions), it would be beneficial to de-noise pixels that fall in blue quadrant 405 more aggressively. In one embodiment, a blue pixel may be defined as any pixel that satisfies the following constraints:

$$f(T_{Cb}) \leq Cb \leq 1, \text{ and} \qquad \text{EQ. 4A}$$

$$-1 \leq Cr \leq g(T_{Cr}), \text{ where} \qquad \text{EQ. 4B}$$

Figure 4B:
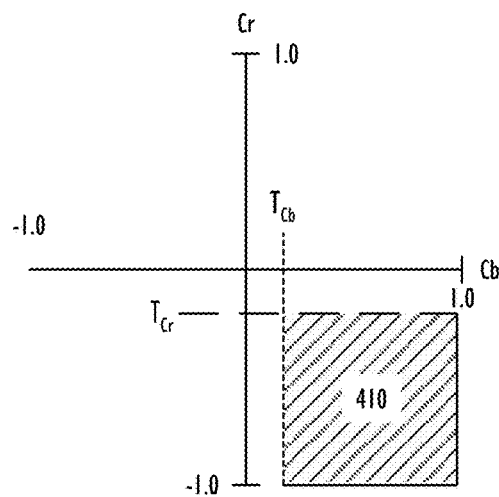
Figure 4C:
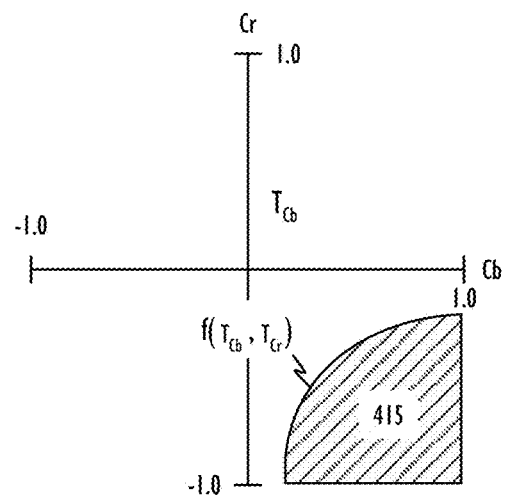

$T_{Cb}$ and $T_{Cr}$ represent Cb and Cr chromaticity thresholds respectively, f(•) represents a first threshold function, g(•) represents a second threshold function, and Cb and Cr refer to the chroma of the pixel being de-noised. Referring to FIG. 4B, one embodiment of EQ. 4 yields "blue" region 410. (f(•) and g(•) are both linear functions). Referring to FIG. 4C, in another embodiment blue region 415 may be defined by a non-linear relationship, $f(T_{Cb}, T_{Cr})$. In general, any relationship that can partition CbCr chromaticity space 400 into blue and not blue regions may be used (e.g., polynomial and piece-wise linear). By itself, it is known that modulating denoising strengths based on color constraints (e.g., as represented by EQ. 2 and illustrated in FIGS. 4B and 4C) has significant negative side-effects (it may cause over-smoothing of blue objects such as shirts, jeans, water texture, etc.). It has been unexpectedly determined, however, that coupling edge/texture constraints with color constraints as described herein help mitigate noise in smooth blue regions such as blue sky without affecting edges/texture in other blue objects.

Threshold values for $T_{Cb}$ and $T_{Cr}$ (EQ. 4) may be unique for each implementation. When determined however, these values may be used in combination with MBNF filter elements (e.g., 310, 330, and 350) within both luma (e.g., Y 205) and chroma (e.g., Cb 250 and Cr 255) channels to generate a de-noised and (optionally) sharpened image. More specifically, threshold values for each luma channel band may be used in conjunction with each band's noise model (e.g., via a MBNR filter element) to determine if a pixel is textured or not textured. Similarly, threshold values for each band of each chroma channel (e.g., chroma channels Cb 250 and Cr 255) may be used in conjunction with each chroma band's noise model (also via a MBNR filter element) to determine if a pixel is blue or not blue. In one embodiment, when a pixel is determined to be associated with a smooth blue region of an image, it may be heavily (aggressively) de-noised and moderately (conservatively) sharpened. If a pixel is determined to be associated with a textured blue region of an image, it may be conservatively de-noised and aggressively sharpened. For pixels that do not satisfy the aforementioned "blue" criteria, de-noising and sharpening strengths may be based on edge/texture strength and high frequency measures. That said, the approach described herein may be easily extended to other colors such as skin or high-level features such as face.

Figure 5:
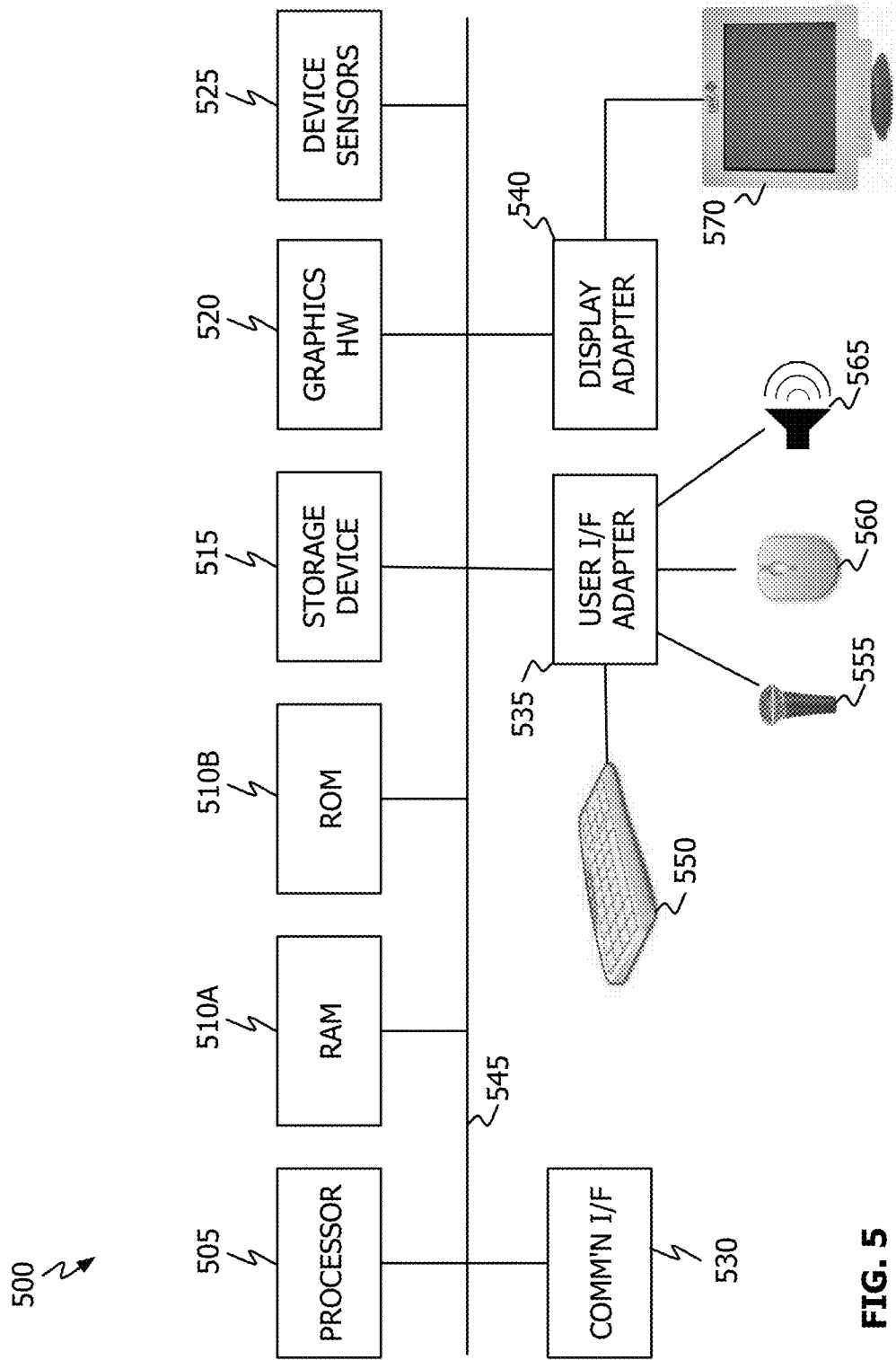
FIG. 5 shows, in block diagram form, a computer system in accordance with one embodiment.

Referring to FIG. 5, the disclosed multi-band noise reduction operations in accordance with this disclosure may be performed by representative computer system 500 (e.g., a general purpose computer system such as a desktop, laptop, notebook or tablet computer system). Computer system 500 may include one or more processors 505, memory 510 (510A and 510B), one or more storage devices 515, graphics hardware 520, device sensors 525 (e.g., 3D depth sensor, proximity sensor, ambient light sensor, accelerometer and/or gyroscope), image capture module 530, communication interface 535, user interface adapter 540 and display adapter 545—all of which may be coupled via system bus or backplane 550 which may be comprised of one or more continuous (as shown) or discontinuous communication links. Memory 510 may include one or more different types of media (typically solid-state) used by processor 505 and graphics hardware 520. For example, memory 510 may include memory cache, read-only memory (ROM), and/or random access memory (RAM). Storage 515 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 510 and storage 515 may be used to retain media (e.g., audio, image and video files), preference information, device profile information, computer program instructions or code organized into one or more modules and written in any desired computer programming language, and any other suitable data. When executed by processor(s) 505 and/or graphics hardware 520 such computer program code may implement one or more of the methods described herein. Image capture module 530 may include one or more image sensors, one or more lens assemblies and any memory, mechanical actuators (e.g., to effect lens movement), and processing elements (e.g., ISP 110) used to capture images. Image capture module 530 may also provide information to processors 505 and/or graphics hardware 520. Communication interface 535 may be used to connect computer system 500 to one or more networks. Illustrative networks include, but are not limited to, a local network such as a USB network, an organization's local area network, and a wide area network such as the Internet. Communication interface 535 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). User interface adapter 535 may be used to connect keyboard 550, microphone 555, pointer device 560, speaker 565 and other user interface devices such as a touch-pad and/or a touch screen and a separate image capture element (not shown). Display adapter 540 may be used to connect one or more display units 570 which may provide touch input capability. Processor 505 may be a system-on-chip such as those found in mobile devices and include one or more dedicated graphics processing units (GPUs). Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 perform computational tasks. In one embodiment, graphics hardware 520 may include one or more programmable GPUs and each such unit may include one or more processing cores.

Figure 6:
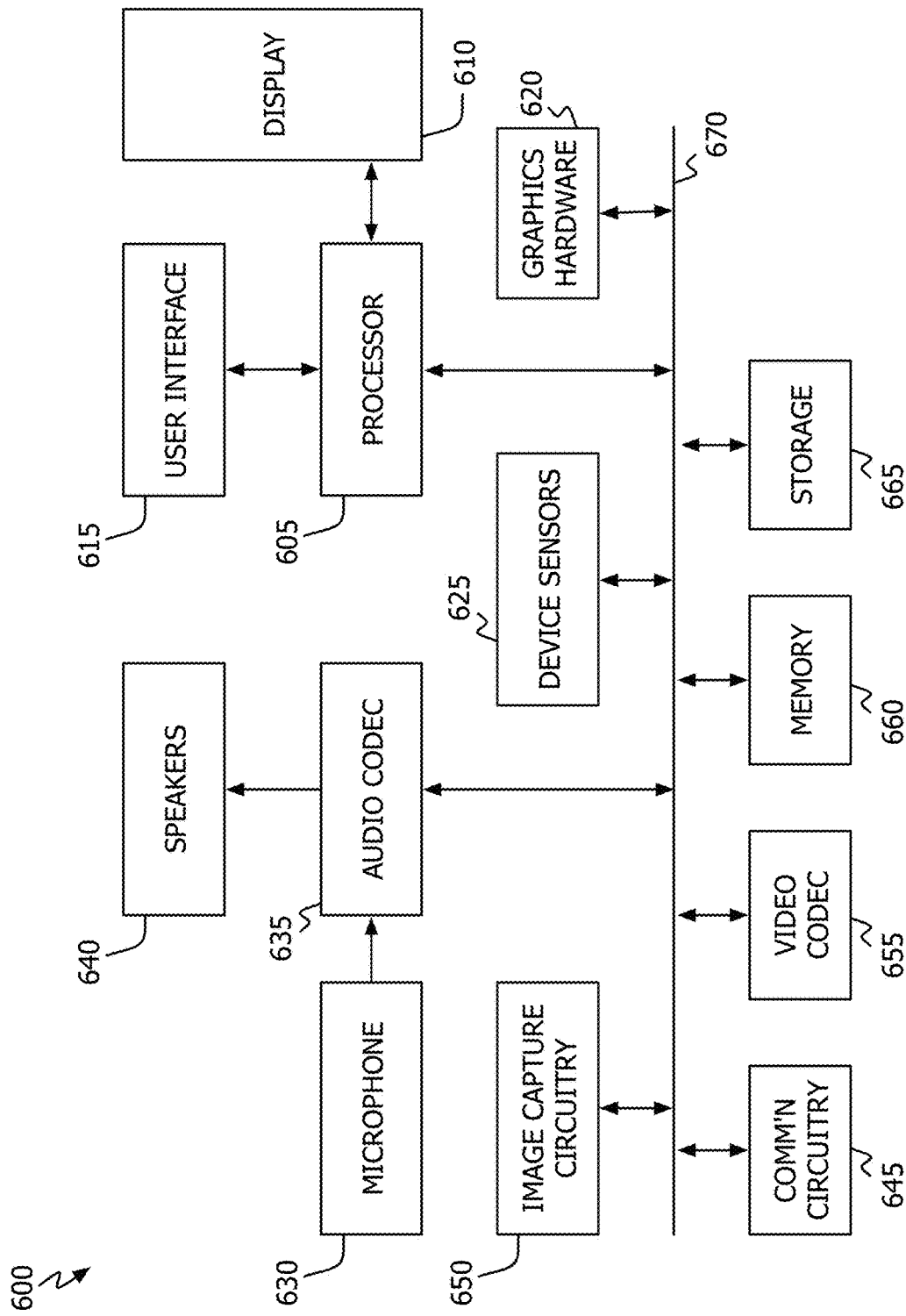
FIG. 6 shows, in block diagram form, a multi-function electronic device in accordance with one embodiment.

Referring to FIG. 6, a simplified functional block diagram of illustrative mobile electronic device 600 is shown according to one embodiment. Electronic device 600 could be, for example, a mobile telephone, personal media device, a notebook computer system, or a tablet computer system. As shown, electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, image capture circuit or unit 650, video codec(s) 655, memory 660, storage 665, and communications bus 670. Processor 605, display 610, user interface 615, graphics hardware 620, device sensors 625, communications circuitry 645, memory 660 and storage 665 may be of the same or similar type and serve the same or similar function as the similarly named component described above with respect to FIG. 5. Audio signals obtained via microphone 630 may be, at least partially, processed by audio codec(s) 635. Data so captured may be stored in memory 660 and/or storage 665 and/or output through speakers 640. Image capture circuitry 650 may capture still and video images. Output from image capture circuitry 650 may be processed, at least in part, by video codec(s) 655 and/or processor 605 and/or graphics hardware 620, and/or stored in memory 660 and/or storage 665. In one embodiment, graphics hardware 620 may include or incorporate image pipeline 100. In another embodiment, image capture circuitry 650 may include or incorporate image pipeline 100. In still another embodiment, MBNR 155 may be included or incorporated within either graphics hardware 620 or image capture circuitry 650. In yet another embodiment, all or parts of the functions described with respect to MBNR 155 may be implemented in software and be executed by processor 650. In another embodiment, some of the functionality attributed to MBNR 155 may be implemented in hardware/firmware executed, for example, by image capture circuitry 650, and some of the functionality may be implemented in software executed, for example, by processor 605.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). For example, MBNR operations are not restricted to implementations using 4 bands; other embodiments may have fewer or more than 4. Further, FIG. 3 shows sharpening filter 305 applied to band Y1 220. This too is not necessary. Each channel (e.g., Luma and chroma) need not be de-noised and/or sharpened the same. For example, an image's luma channel may apply a sharpening filter to the luma signal's highest frequency band whereas one or more of the image's chroma channels may not use a sharpening filter on its corresponding highest frequency band. In another embodiment, one or more other bands (luma and/or chroma) may also exclude use of a sharpening filter. It is further noted that each channel and each band may have its own noise model and employ its own unique tuning factor, K#. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A multi-band noise reduction method, comprising:
   receiving an image, the image comprising a first type of channel and a plurality of other types of channels, each channel type being different;
   applying multi-band noise reduction to generate a multi-band pyramidal representation for each channel, wherein each channel's multi-band noise reduction is based on channel-specific and band-specific noise models;
   determining a texture metric value for the first channel type, the texture metric value based on the first channel type's multi-band pyramidal representation;
   determining a blue-chroma metric value based on the plurality of other channel types, the blue-chroma metric value based on the multi-band pyramidal representations of the plurality of other channel types;
   de-noising aggressively and sharpening conservatively at least some of the pixels in the image's first channel having a texture metric value indicative of a smooth region and a blue-chroma metric value indicative of a blue pixel;
   de-noising conservatively and sharpening aggressively at least some of the pixels in the image's first channel having a texture metric value indicative of a not smooth region and a blue-chroma metric value indicative of a not blue pixel;
   combining, after de-noising, the first type of channel and the plurality of other types of channels to generate a filtered image; and
   storing the filtered image in a memory.

2. The method of claim 1, further comprising denoising at least some of the pixels in each of the image's plurality of other types of channels.

3. The method of claim 1, wherein the first channel comprises a luma channel and the plurality of other channel types comprises a plurality of chroma channels.

4. The method of claim 1, wherein the texture metric value is based on a gradient between different pixels in the first channel's multi-band pyramidal representation.

5. The method of claim 4, wherein the different pixels comprise pixels in at least two different bands in the first channel's multi-band pyramidal representation.

6. The method of claim 1, wherein the blue-chroma metric value is based on a partition of a chromaticity space using one or more threshold values.

7. The method of claim 6, wherein the one or more threshold values comprise a threshold value for each of a plurality of chroma channels.

8. The method of claim 1, wherein determining a texture metric value for the first channel type further comprises determining a high frequency metric value based on a difference between a pixel value in a first band of the first channel and a corresponding pixel in an up-sampled version of a lower band of the first channel.

9. The method of claim 8, wherein de-noising aggressively and sharpening conservatively comprises de-noising aggressively and sharpening conservatively at least some of the pixels in the image's first channel having a texture metric value indicative of a smooth region, a high frequency metric value indicative of a smooth region, and a blue-chroma metric value indicative of a blue pixel.

10. The method of claim 8, wherein de-noising conservatively and sharpening aggressively comprises de-noising conservatively and sharpening aggressively at least some of the pixels in the image's first channel having a texture metric value indicative of a not smooth region, a high frequency metric value indicative of a not smooth region, and a blue-chroma metric value indicative of a not blue pixel.

11. A non-transitory program storage device comprising instructions stored thereon to cause one or more processors to:
receive an image, the image comprising a first type of channel and a plurality of other types of channels, each channel type being different;
apply multi-band noise reduction to generate a multi-band pyramidal representation for each channel, wherein each channel's multi-band noise reduction is based on channel-specific and band-specific noise models;
determine a texture metric value for the first channel type, the texture metric value based on the first channel type's multi-band pyramidal representation;
determine a blue-chroma metric value based on the plurality of other channel types, the blue-chroma metric value based on the multi-band pyramidal representations of the plurality of other channel types
de-noise aggressively and sharpen conservatively at least some of the pixels in the image's first channel having a texture metric value indicative of a smooth region and a blue-chroma metric value indicative of a blue pixel;
de-noise conservatively and sharpen aggressively at least some of the pixels in the image's first channel having a texture metric value indicative of a not smooth region and a blue-chroma metric value indicative of a not blue pixel;
combine, after de-noising, the first type of channel and the plurality of other types of channels to generate a filtered image; and
store the filtered image in a memory.

12. The non-transitory program storage device of claim 11, further comprising instructions to cause the one or more processors to de-noise at least some of the pixels in each of the image's plurality of other types of channels.

13. The non-transitory program storage device of claim 11, wherein the first channel comprises a luma channel and the plurality of other channel types comprises a plurality of chroma channels.

14. The non-transitory program storage device of claim 11, wherein the texture metric value is based on a gradient between different pixels in the first channel's multi-band pyramidal representation.

15. The non-transitory program storage device of claim 14, wherein the different pixels comprise pixels in at least two different bands in the first channel's multi-band pyramidal representation.

16. The non-transitory program storage device of claim 11, wherein the blue-chroma metric value is based on a partition of a chromaticity space using one or more threshold values.

17. The non-transitory program storage device of claim 16, wherein the one or more threshold values comprise a threshold value for each of a plurality of chroma channels.

18. The non-transitory program storage device of claim 11, wherein the instructions to cause the one or more processors to determine a texture metric value for the first channel type comprise instructions to cause the one or more processors to determine a high frequency metric value based on a difference between a pixel value in a first band of the first channel and a corresponding pixel in an up-sampled version of a lower band of the first channel.

19. The non-transitory program storage device of claim 18, wherein the instructions to cause the one or more processors to de-noise aggressively and sharpen conservatively comprise instructions to cause the one or more processors to de-noise aggressively and sharpen conservatively at least some of the pixels in the image's first channel having a texture metric value indicative of a smooth region, a high frequency metric value indicative of a smooth region, and a blue-chroma metric value indicative of a blue pixel.

20. The non-transitory program storage device of claim 18, wherein the instructions to cause the one or more processors to de-noise conservatively and sharpen aggressively comprise instructions to cause the one or more processors to de-noise conservatively and sharpen aggressively at least some of the pixels in the image's first channel having a texture metric value indicative of a not smooth region, a high frequency metric value indicative of a not smooth region, and a blue-chroma metric value indicative of a not blue pixel.

21. An image capture system, comprising:
an image sensor;
a memory operatively coupled to the image sensor;
a display operatively coupled to the memory; and
one or more processors coupled to the image sensor, memory and display, the one or more processors configured to execute instructions stored in the memory to cause the image capture system to:
receive an image from the image sensor,
store the image in the memory, the image comprising a first type of channel and a plurality of other types of channels, each channel type being different,
apply multi-band noise reduction to generate a multi-band pyramidal representation for each channel, wherein each channel's multi-band noise reduction is based on channel-specific and band-specific noise models,
determine a texture metric value for the first channel type, the texture metric value based on the first channel type's multi-band pyramidal representation,
determine a blue-chroma metric value based on the plurality of other channel types, the blue-chroma metric value based on the multi-band pyramidal representations of the plurality of other channel types,
de-noise aggressively and sharpen conservatively at least some of the pixels in the image's first channel having a texture metric value indicative of a smooth region and a blue-chroma metric value indicative of a blue pixel,
de-noise conservatively and sharpen aggressively at least some of the pixels in the image's first channel having a texture metric value indicative of a not smooth region and a blue-chroma metric value indicative of a not blue pixel,
combine, after de-noising, the first type of channel and the plurality of other types of channels to generate a filtered image, and
display the filtered image on the display.

22. The image capture system of claim 21, wherein the first channel comprises a luma channel and the plurality of other channel types comprises a plurality of chroma channels.

23. The image capture system of claim 21, wherein the instructions to cause the one or more processors to determine a texture metric value for the first channel type comprise instructions to cause the one or more processors to determine a high frequency metric value based on a difference between a pixel value in a first band of the first channel and a corresponding pixel in an up-sampled version of a lower band of the first channel.

24. The image capture system of claim 23, wherein the instructions to cause the one or more processors to de-noise aggressively and sharpen conservatively comprise instructions to cause the one or more processors to de-noise aggressively and sharpen conservatively at least some of the pixels in the image's first channel having a texture metric value indicative of a smooth region, a high frequency metric value indicative of a smooth region, and a blue-chroma metric value indicative of a blue pixel.

25. The image capture system of claim 23, wherein the instructions to cause the one or more processors to de-noise conservatively and sharpen aggressively comprise instructions to cause the one or more processors to de-noise conservatively and sharpen aggressively at least some of the pixels in the image's first channel having a texture metric value indicative of a not smooth region, a high frequency metric value indicative of a not smooth region, and a blue-chroma metric value indicative of a not blue pixel.

* * * * *